US012277574B1

(12) United States Patent
Bube et al.

(10) Patent No.: US 12,277,574 B1
(45) Date of Patent: Apr. 15, 2025

(54) DEMOGRAPHIC BASED PROSPECTIVE SHOPPER IDENTIFICATION SYSTEM AND RELATED METHODS

(71) Applicant: Inmar Clearing, Inc., Winston-Salem, NC (US)

(72) Inventors: Melissa Bube, High Point, NC (US); Jacob Bowman, Greensboro, NC (US); Andreas M. Benamou, Spicewood, TX (US)

(73) Assignee: INMAR CLEARING, INC., Winston-Salem, NC (US)

( * ) Notice: Subject to any disclaimer, the term of this patent is extended or adjusted under 35 U.S.C. 154(b) by 0 days.

(21) Appl. No.: 18/529,988

(22) Filed: Dec. 5, 2023

(51) Int. Cl.
*G06Q 30/0207* (2023.01)
*G06Q 30/0204* (2023.01)
*H04L 51/02* (2022.01)

(52) U.S. Cl.
CPC ..... *G06Q 30/0224* (2013.01); *G06Q 30/0204* (2013.01); *H04L 51/02* (2013.01)

(58) Field of Classification Search
CPC . G06Q 30/0224; G06Q 30/0204; H04L 51/02
See application file for complete search history.

(56) References Cited

U.S. PATENT DOCUMENTS

| | | | | |
|---|---|---|---|---|
| 8,909,771 | B2* | 12/2014 | Heath | G06Q 30/02 709/224 |
| 11,769,159 | B2 | 9/2023 | Chaudhuri | |
| 12,020,045 | B1* | 6/2024 | Wilson | G06F 9/44521 |
| 2008/0071614 | A1* | 3/2008 | Mebruer | G06Q 30/0222 705/14.23 |
| 2012/0084223 | A1* | 4/2012 | Briet | G06Q 10/08355 705/338 |
| 2018/0336414 | A1* | 11/2018 | Badr | G06F 16/90332 |
| 2024/0249318 | A1* | 7/2024 | Spiegel | H04L 51/02 |
| 2024/0265211 | A1* | 8/2024 | Mihai | H04L 51/02 |

FOREIGN PATENT DOCUMENTS

WO    WO-2024107426 A1 *  5/2024  ............. G06N 3/047

OTHER PUBLICATIONS

A Multiple Source based Transfer Learning Framework for Marketing Campaigns James Brownlow, Charles Chu, Guandong Xuy, Ben Culbert, Bin Fu, and Qinxue Meng (Year: 2018).*

* cited by examiner

*Primary Examiner* — Alexandru Cirnu
(74) *Attorney, Agent, or Firm* — ALLEN, DYER, DOPPELT, + GILCHRIST, P.A.

(57) ABSTRACT

A shopper identification system may include shopper devices, and a shopper identification server. The shopper identification server may be configured to obtain product purchase history data corresponding to shoppers, obtain shopper identification data corresponding to the plurality of shoppers, and determine shopper demographics associated with purchased products of a brand based upon the product purchase history data and the shopper identification data. The shopper identification server may also be configured to apply a large language model (LLM) to identify prospective shoppers from among the shoppers that are likely to purchase products of the brand based upon the shopper demographics and generate and communicate a digital promotion to corresponding ones of the shopper devices associated with the prospective shoppers.

13 Claims, 6 Drawing Sheets

DEMOGRAPHIC BASED PROSPECTIVE SHOPPER IDENTIFICATION SYSTEM AND RELATED METHODS

TECHNICAL FIELD

The present invention relates to the field of shopper identification, and, more particularly, to identifying prospective shoppers based upon demographics and related methods.

BACKGROUND

Sales of a particular product or service may be based upon how well that product or service is marketed to a consumer. One form of marketing or promotion is a coupon, typically in paper form, for a discount toward the product or service. Some coupons may be retailer specific, for example, only redeemable for the discount at a particular retailer, while other coupons may be product specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon, for example, the quantity of a given item, brand of item, size of the product in terms of packaging, and/or the price point of the given item. A typical coupon may also be redeemable only at a given retailer and/or within a threshold time period.

SUMMARY

A shopper identification system may include a plurality of shopper devices, and a shopper identification server. The shopper identification server may be configured to obtain product purchase history data corresponding to a plurality of shoppers and obtain shopper identification data corresponding to the plurality of shoppers. The shopper identification server may be further configured to determine shopper demographics associated with purchased products of a brand based upon the product purchase history data and the shopper identification data and apply a large language model (LLM) to identify prospective shoppers from among the plurality of shoppers that are likely to purchase products of the brand based upon the shopper demographics. The shopper identification server may also be configured to generate and communicate a digital promotion to corresponding ones of the plurality of shopper devices associated with the prospective shoppers.

The shopper identification system may also include a user device configured to accept desired shopper reach data associated with the digital promotion. The shopper identification server may be configured to cooperate with the user device to obtain the desired shopper reach data and apply the LLM to identify the prospective shoppers based upon the desired shopper reach data, for example.

The shopper identification server may be configured to cooperate with the user device to accept the desired shopper reach data via a natural language processing (NLP) interface. The shopper identification server may be configured to cooperate with the user device to operate a chatbot to accept the desired shopper reach data, for example.

The desired shopper reach data may include at least one of a desired number of shoppers, desired shopper geographic area, desired shopper income, and desired shopper brand loyalty, for example. The shopper identification system may include a user device configured to accept desired digital promotion data associated with the digital promotion, and wherein the identification server is configured to cooperate with the user device to apply the LLM to identify the prospective shoppers based upon the digital promotion data.

The shopper identification server may be configured to identify the prospective shoppers by at least excluding shoppers that have previously purchased a product of the brand. The shopper identification server may be configured to train the LLM based upon supervised learning techniques to classify the plurality of shoppers based upon the shopper demographics, for example.

The shopper identification server may be configured to apply the LLM to generate classes of shoppers, identify overlap between the classes of shoppers, and remove from the prospective shoppers, shoppers identified as overlapped between the classes of shoppers. The digital promotion may be redeemable toward a product for purchase of the brand, for example.

A method aspect is directed to a method of identifying a shopper. The method may include using a shopper identification server to obtain product purchase history data corresponding to a plurality of shoppers and obtain shopper identification data corresponding to the plurality of shoppers. The method may further include using the shopper identification server to determine shopper demographics associated with purchased products of a brand based upon the product purchase history data and the shopper identification data and apply a large language model (LLM) to identify prospective shoppers from among the plurality of shoppers that are likely to purchase products of the brand based upon the shopper demographics. The method may further include using the shopper identification server to generate and communicate a digital promotion to corresponding ones of the plurality of shopper devices associated with the prospective shoppers.

A computer readable medium aspect is directed to a non-transitory computer readable medium for identifying shoppers. The non-transitory computer readable medium includes computer executable instructions that when executed by a processor cause the processor to perform operations. The operations may include obtaining product purchase history data corresponding to a plurality of shoppers and obtaining shopper identification data corresponding to the plurality of shoppers. The operations may also include determining shopper demographics associated with purchased products of a brand based upon the product purchase history data and the shopper identification data and applying a large language model (LLM) to identify prospective shoppers from among the plurality of shoppers that are likely to purchase products of the brand based upon the shopper demographics. The operations may further include generating and communicating a digital promotion to corresponding ones of the plurality of shopper devices associated with the prospective shoppers.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
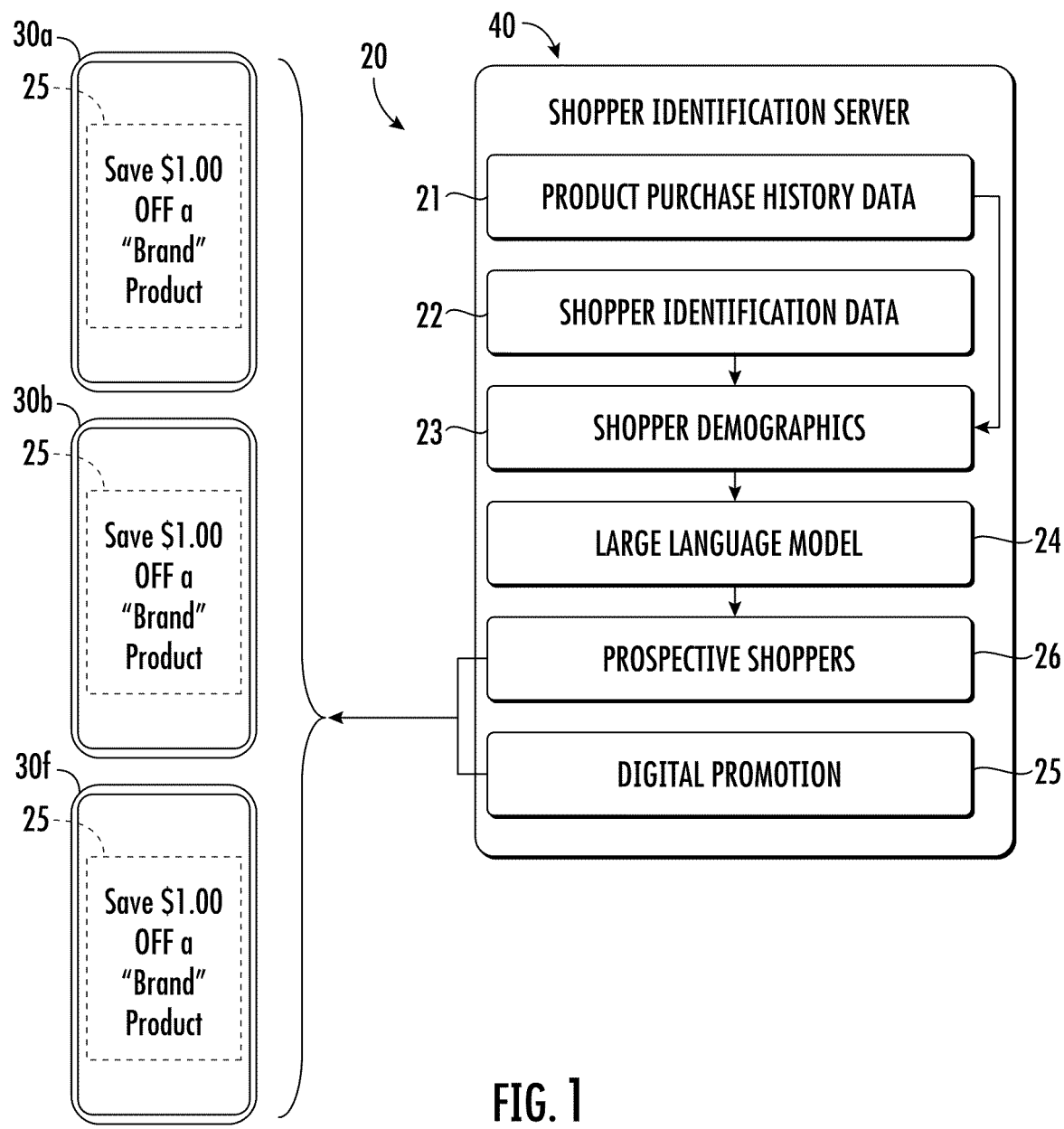
FIG. 1 is a schematic diagram of a shopper identification system in accordance with an embodiment.
Figure 2:
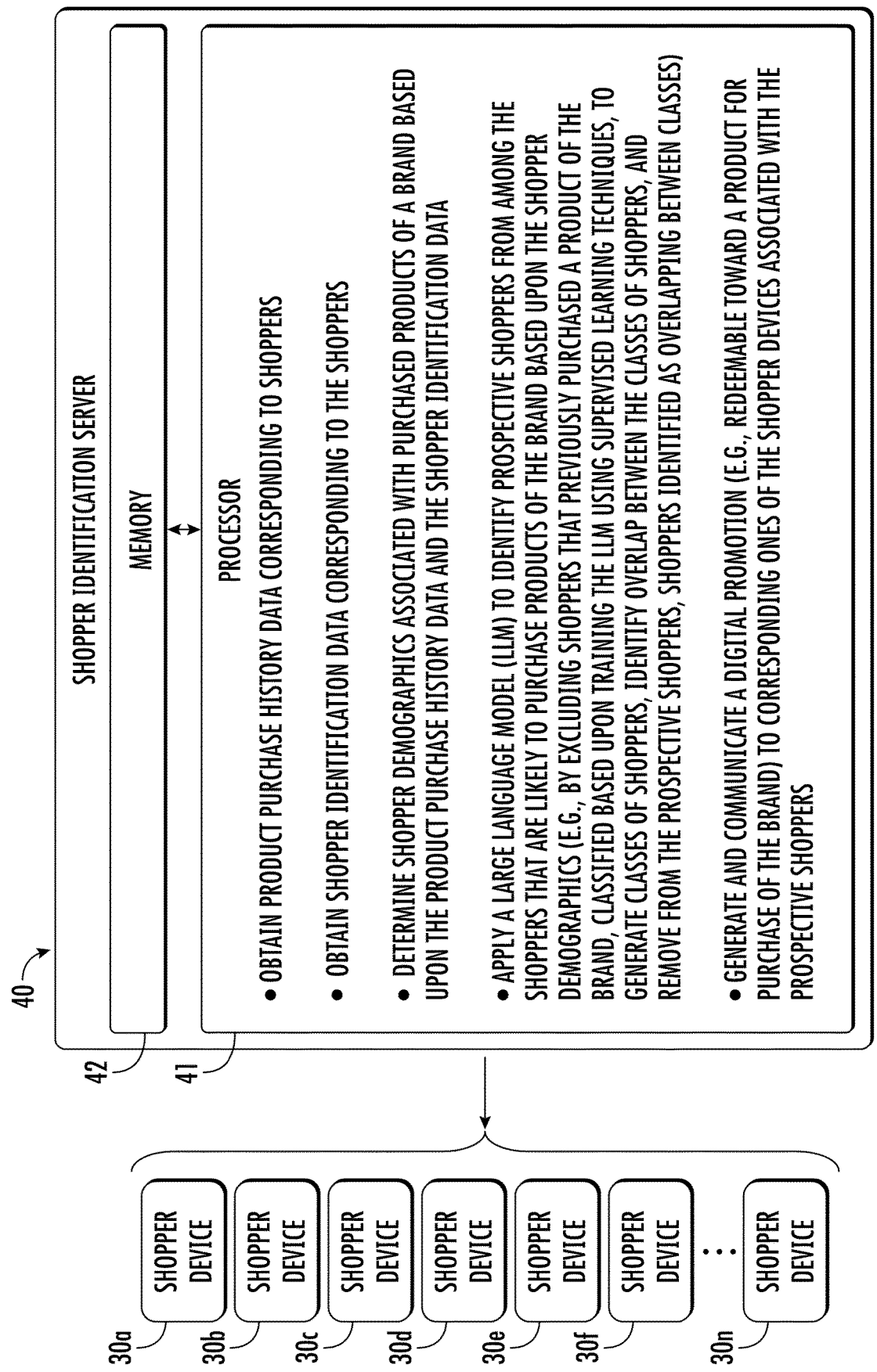
FIG. 2 is a schematic block diagram of the shopper identification system of FIG. 1.

Referring initially to FIGS. 1 and 2, a shopper identification system 20 includes shopper devices 30a-30n. The shopper devices 30a-30n are each associated with a shopper and/or prospective shopper. The shopper devices 30a-30n may be in the form of mobile wireless communications devices, e.g., mobile or smartphones, tablet computers, desktop computers, laptop computers, and wearable computers, for example. The shopper devices 30a-30n may each cooperate with an interface, for example, an application programming interface (API).

The shopper identification system 20 may also include a shopper identification server 40. The shopper identification server 40 includes a processor 41 and an associated memory 42. While operations of the shopper identification server 40 are described herein, those skilled in the art will appreciate that the processor 41 and the memory 42 cooperate to perform the operations.

Figure 3:
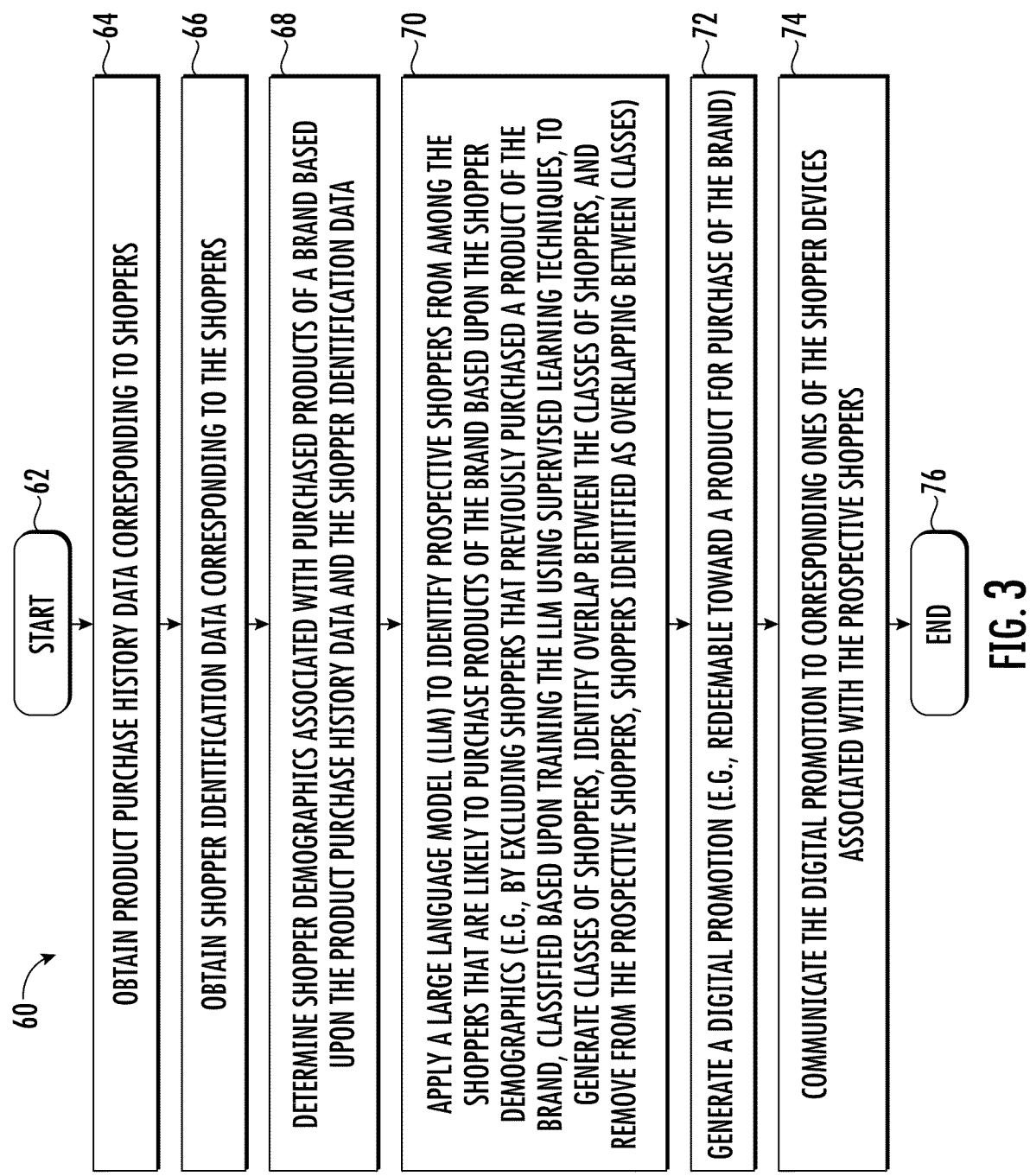
FIG. 3 is a flow chart illustrating operation of the shopper identification server of FIG. 1.

Referring now to the flowchart 60 in FIG. 3, beginning at Block 62 operations of the shopper identification server 40 will now be described. The shopper identification server 40 obtains product purchase history data 21 (Block 64). The shopper identification server 40 may obtain the product purchase history data 21 from retailers, for example, retailer servers. For example, the product purchase history data 21 may be obtained from one or more retailer from corresponding point-of-sale (POS) devices during the checkout process. The product purchase history data 21 may be obtained as products for purchase are being scanned or upon the completion of an order or purchase.

The product purchase history data 21 may include time and date of the purchase, product identifiers (e.g., stock keeping units (SKUs), uniform product codes (UPCs), or other identifiers), product quantities, product prices, order totals, brand information, product description, store location, and/or whether a coupon or promotion was applied. Of course, the product purchase history 21 may include other and/or additional data related to previously purchased products or products being purchased.

At Block 66, the shopper identification server 40 obtains shopper identification data 22 corresponding to shoppers. The shopper identification data 22 may include name, address, phone number, email address, loyalty account number, and/or birthday. The shopper identification data 22 may include other and/or additional information.

The shopper identification server 40 may obtain the shopper identification data 22 from shoppers, for example, entered via the shopper devices 30a-30n. The shopper identification server 40 may interface with one or more loyalty programs associated with one or more retailers to obtain the shopper identification data 22. As will be appreciated by those skilled in the art, a shopper, when registering for a loyalty program, typically provides certain shopper identification data 22, such as, for example, the exemplary shopper identification data described above.

The shopper identification server 40, at Block 68, determines shopper demographics 23 associated with the purchased products of a brand. The shopper identification server 40 determines the shopper demographics for the brand based upon the product purchase history data 21 and the shopper identification data 22. More particularly, the shopper identification server 40 may determine that, for any given brand, shoppers fit a certain demographic, such as, for example, ages, incomes, household sizes and ages, household incomes, and/or ethnicities. The shopper identification server 40 may determine the shopper demographics 23 by identifying other brands that the shopper typically purchases and comparing these brands to known demographics. In other words, the shopper identification server 40 may determine or infer shopper demographics 23 based upon the product purchase history data 21. For example, if a given shopper typically purchases certain ethnic food types, the shopper identification server 40 may operate a machine learning algorithm to determine an ethnicity associated with the shopper. If a particular brand is associated with a certain ethnicity, and that shopper typically purchases that brand, then the shopper demographic data may be indicative of the shopper being that ethnicity, even as it relates to another brand.

The shopper identification server 40 may also determine the shopper demographics 23 by comparing certain previously purchased products to known demographic data. For example, shoppers that typically purchase "Brand-A" may fit a certain demographic in terms of age, income, etc. Accordingly, it may be desirable to expand a given brand's demographic to shoppers that do not typically purchase the brand. For example, if "Brand-A" is typically associated with suburban female shoppers aged 40-60, it may be desirable to expand the reach of "Brand-A" to urban females under the age of 30. However, it may be particularly difficult to target prospective shoppers outside a brand's established demographic, particularly without upsetting the established demographic.

Accordingly, at Block 70, the shopper identification server 40 applies a large language model (LLM) 24 to identify prospective shoppers 26 that are likely to purchase products of the brand based upon the shopper demographics 23. As will be appreciated by those skilled in the art, the LLM 24, as an artificial intelligence (AI) model, uses the relatively large amounts of data, particularly, the shopper demographics 23, and optionally the product purchase data 21 and the shopper identification data 22, to learn parameters during operations including, for example, training operations. The LLM 24 uses one or more artificial neural networks, mainly transformers, and may be pre-trained or trained using self-supervised learning and semi-supervised learning, as will be appreciated by those skilled in the art. The LLM 24 applies concepts that may typically be associated with word prediction such that the LLM, accepts the shopper demographics 23, e.g., conceptually, as words to predict next words, which correlate to the prospective shoppers 26 of other shopper demographics that do not normally purchase products of the brand. The LLM 24 may thus be trained based upon supervised learning techniques to classify the shoppers based upon the shopper demographics 23.

The LLM 24, based upon the shopper demographics 23, may identify shoppers that are relatively closely associated with the brand, for example, that may be considered brand loyal. The LLM 24 may then exclude shoppers that have previously purchased a product of the brand, i.e., those shoppers that are brand loyal, since it may be desirable to avoid disturbing the existing shopper demographic for the brand. In other words, the shopper identification server 40 may create, based upon execution of the LLM 24, classes of shoppers and determine whether there may be potential conflicts among the classes or groups, for example, as may occur among different promotion campaign sympathizers.

Operation of the LLM 24 may identify shoppers associated with the classes or groups (i.e., demographics) that may coexist with existing demographics for the brand, yet not be considered within the reach or the typical demographic for the brand. In other words, the shopper identification server 40 operates to identify prospective shoppers 26 that are likely to purchase products of the brand, yet do not typically purchase products of the brand and that if targeted with a promotion, would not likely affect the existing group or groups that typically purchase products of the brand. For example, overlap may be identified between the generated classes of shoppers. Shoppers that are identified as being part of overlapping classes may be removed from the prospective shoppers 26.

At Block 72, the shopper identification server 40 may generate a digital promotion 25. The digital promotion 25 is illustratively in the form of a digital coupon that is redeemable toward a discount on a product for purchase of the brand. While the digital promotion 25 is illustratively in the form of a digital coupon, the digital promotion may be in the form of a digital rebate.

The shopper identification server 40 communicates the digital promotion 25 to the shopper devices 30a, 30b, 30f associated with the prospective shoppers 26 (Block 74). The digital promotion 25 may be displayed on a display of the shopper devices 30a, 30b, 30f associated with the prospective shoppers 26. The shopper identification server 40 may communicate the digital promotion 25 to the shopper devices 30a, 30b, 30f associated with the prospective shoppers 26 by communicating the digital promotion via an API such that when a prospective shopper visits a website or opens a retailer application, the prospective shopper is presented, visually, with the digital promotion. Operations end at Block 76.

Figure 4:
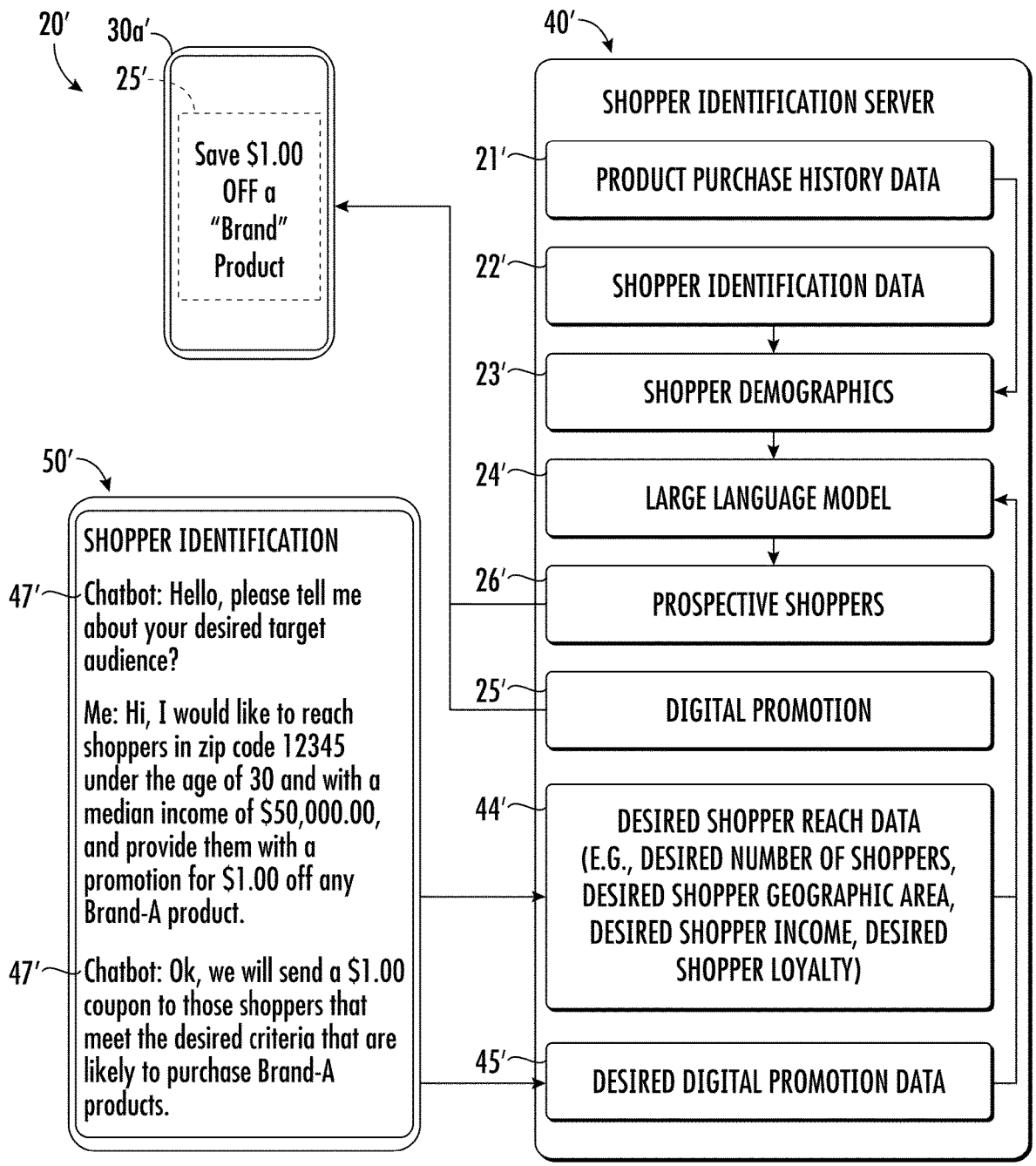
FIG. 4 is a schematic diagram of a shopper identification system in accordance with another embodiment.
Figure 5:
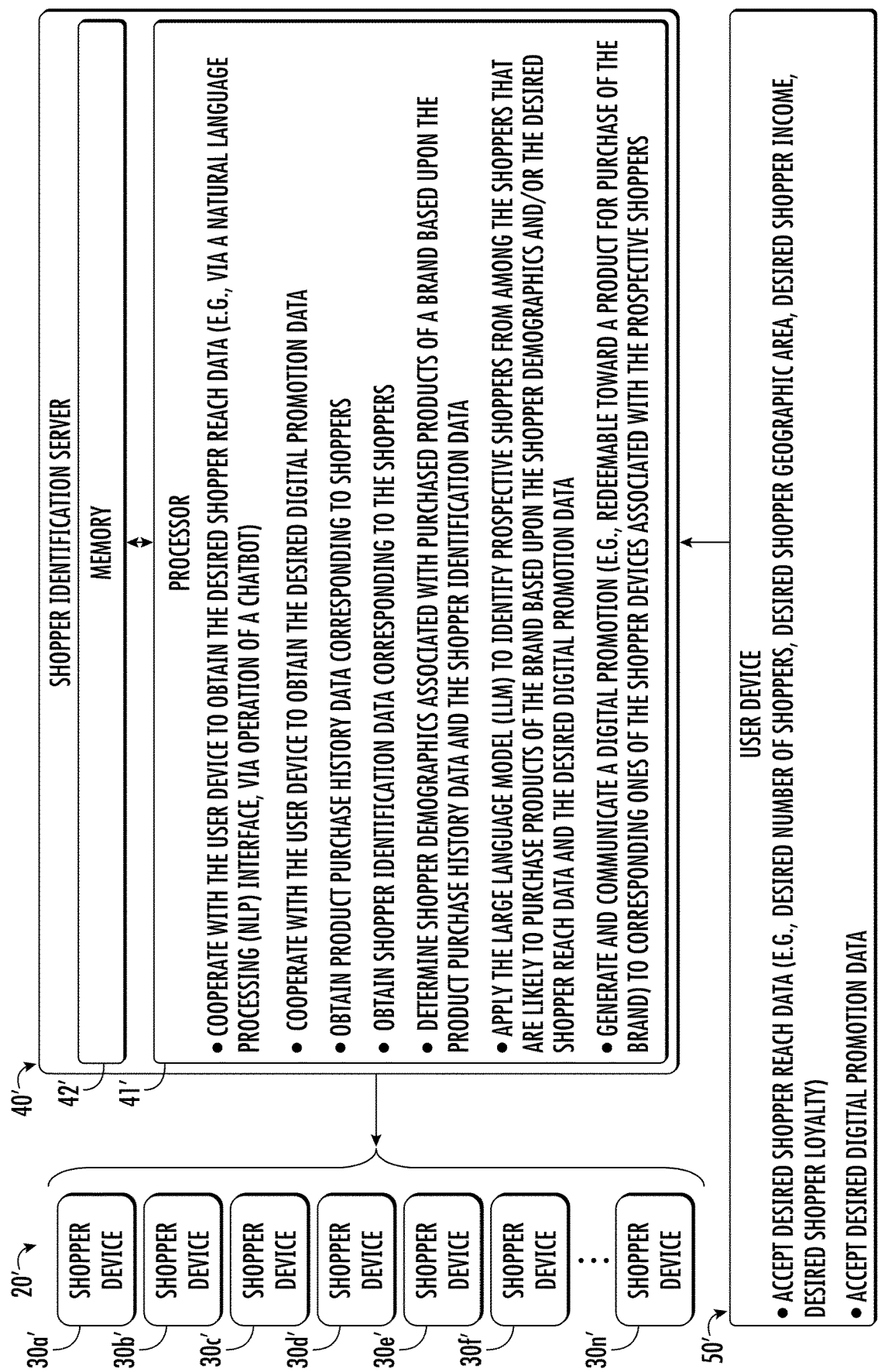
FIG. 5 is a schematic block diagram of the shopper identification system of FIG. 4.

Referring now to FIGS. 4 and 5, in another embodiment, the shopper identification system 20' includes at least one user device 50'. The user device 50' may be associated with the brand, for example. The user device 50' may be in the form of a desktop computer, or a mobile wireless communications device, for example, a laptop computer, mobile or smart phone, wearable computer, tablet computer, or virtual assistant device.

The shopper identification server 40', via cooperation between the memory 42' and the processor 41', cooperates with the user device 50' to provide a user or brand interface. The interface may be in the form of a chatbot conversion for example. More particularly, the shopper identification server 40' may cooperate with the user device 50' to operate a chatbot 47'. The shopper identification server 40' may, for example, via the chatbot 47' communicate computer instructions to the user device 50' (e.g., via a remote server) that cause the user device to prompt the user associated with the brand for desired shopper reach data 44'. Desired shopper reach data 44' may include total number of desired prospective shoppers 26' to which to send the digital promotion 25', desired geographic location data of prospective shoppers, desired ages and incomes of the prospective shoppers, desired shopper brand loyalty (e.g., desired level of loyalty-always buys, sometime buys, never buys, etc.). Desired shopper data may include other and/or additional data for filtering prospective shoppers 26'.

The shopper identification server 40' also cooperates with the user device 50' to accept or obtain desired digital promotion data 45', for example, also via the chatbot 47'. Desired digital promotion data 45' may include the redeemable value of the digital promotion 25', select products of the brand for which the digital promotion is redeemable, and the amount of digital promotions being generated and communicated, for example. The desired digital promotion data 45' may include other and/or other types of data relating to the digital promotion 25'.

The shopper identification server 40' applies the LLM 24' to identify the prospective shoppers 26' based upon the desired shopper reach data 44' and the desired digital promotion data 45'. In other words, the LLM 24' may use, e.g., as an input, the terms or words that define the desired shopper reach data 44'. The LLM 24' may identify, as output, the prospective shoppers 26', for example, that fall within the desired parameters (e.g., desired shopper reach data 44' and desired digital promotion data 45').

The desired shopper reach data 44' and the desired digital promotion data 45' may be accepted by the user device 50' by way of a natural language processing (NLP) interface. More particularly, spoken terms or data representative thereof may be communicated to the shopper identification server 40' such that the shopper identification server applies NLP to understand the contents of the spoken terms, including any contextual nuances. The shopper identification server 40' may thus extract information to be used by the LLM 24' that may be considered insights for the purposes of categorizing and classification, for example, by the LLM. In other words, the user may speak or type the desired shopper reach data 44' and the desired digital promotion data 45', for example, via the chatbot 47', in the form of sentences or as if the user were having a conversation (e.g., I would like to reach shoppers in zip code 12345 under the age of 30 and with a median income of $50,000.00, and provide them with a promotion for $1.00 off any Brand-A product). The digital promotion 25' is generated and communicated to shopper devices 30a' corresponding to the prospective shoppers 26' from among the shopper devices 30a'-30n'.

Figure 6:
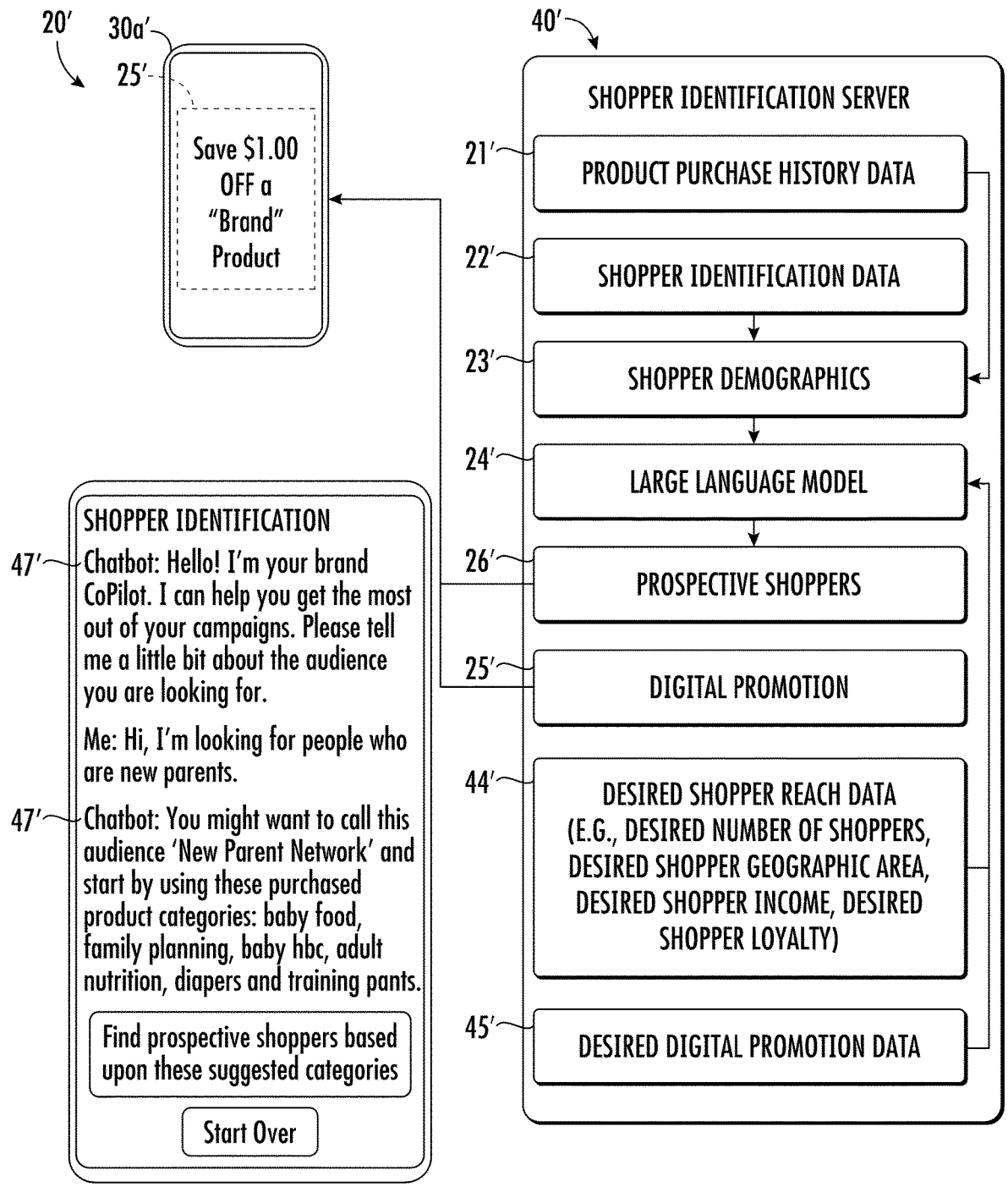
FIG. 6 is another schematic diagram of the shopper identification system of FIG. 4 illustrating another exemplary chatbot conversation.

Referring now briefly to FIG. 6, in another exemplary operation of the chatbot 47', the chatbot may query the user for the desired shopper reach data 44' broadly in the form of the desired audience. The shopper identification server 40' may, by operation of the NLP interface and the LLM 24', determine the corresponding product categories. Using the determined product categories, for example, as input to the LLM 24', the prospective shoppers 26' that are likely to purchase products of the brand and based upon the prospective shoppers falling into one of these determined categories (e.g., that typically purchase products in these product categories) are identified. Other parameters of the digital promotion 25' and shopper demographics 23' are used to identify the prospective shoppers 26' as described above. Elements illustrated, but not specifically described, such as, for example, the product purchase history 21' and the shopper identification data 22' are similar to those described in the embodiment above.

A method aspect is directed to a method of identifying shopper. The method includes using a shopper identification server 40 to obtain product purchase history data 21 corresponding to a plurality of shoppers and obtain shopper identification data 22 corresponding to the plurality of shoppers. The method further includes using the shopper identification server 40 to determine shopper demographics 23 associated with purchased products of a brand based upon the product purchase history data 21 and the shopper identification data 22 and apply a large language model (LLM) 24 to identify prospective shoppers 26 from among the plurality of shoppers that are likely to purchase products of the brand based upon the shopper demographics. The method further includes using the shopper identification server 40 to generate and communicate a digital promotion 25 to corresponding ones of the plurality of shopper devices 30a-30n associated with the prospective shoppers 26.

A computer readable medium aspect is directed to a non-transitory computer readable medium for identifying shoppers. The non-transitory computer readable medium includes computer executable instructions that when executed by a processor 41 cause the processor to perform operations. The operations include obtaining product purchase history data 21 corresponding to a plurality of shoppers and obtaining shopper identification data 22 corresponding to the plurality of shoppers. The operations also include determining shopper demographics 23 associated with purchased products of a brand based upon the product purchase history data 21 and the shopper identification data 22 and applying a large language model (LLM) 24 to identify prospective shoppers from among the plurality of shoppers that are likely to purchase products of the brand based upon the shopper demographics. The operations further include generating and communicating a digital promotion 25 to corresponding ones of the plurality of shopper devices 30a-30n associated with the prospective shoppers.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A shopper identification system comprising:
    a user device configured to accept desired shopper reach data associated with a digital promotion;
    a plurality of shopper devices; and
    a shopper identification server configured to
        obtain product purchase history data corresponding to a plurality of shoppers,
        obtain shopper identification data corresponding to the plurality of shoppers,
        determine shopper demographics associated with purchased products of a brand based upon the product purchase history data and the shopper identification data,
        cooperate with the user device to operate a chatbot to obtain the desired shopper reach data via a natural language processing (NLP) interface,
        apply a large language model (LLM) to identify prospective shoppers from among the plurality of shoppers that are likely to purchase products of the brand based upon the shopper demographics and based upon the desired shopper reach data, the LLM identifying the prospective shoppers by accepting, as input thereto, the shopper demographics as LLM words, and predicting next LLM words correlated to the prospective shoppers, the LLM being trained based upon supervised learning techniques to classify the plurality of shoppers based upon the shopper demographics, and
        generate and communicate the digital promotion to corresponding ones of the plurality of shopper devices associated with the prospective shoppers.

2. The shopper identification system of claim 1 wherein the desired shopper reach data comprises at least one of a desired number of shoppers, desired shopper geographic area, desired shopper income, and desired shopper brand loyalty.

3. The shopper identification system of claim 1 wherein the user device is configured to accept desired digital promotion data associated with the digital promotion; and wherein the shopper identification server is configured to cooperate with the user device to apply the LIM to identify the prospective shoppers based upon the desired digital promotion data.

4. The shopper identification system of claim 1 wherein the shopper identification server is configured to identify the prospective shoppers by at least excluding shoppers that have previously purchased a product of the brand.

5. The shopper identification system of claim 1 wherein the shopper identification server is configured to apply the LLM to generate classes of shoppers, identify overlap between the classes of shoppers, and remove from the prospective shoppers the shoppers identified as overlapped between the classes of shoppers.

6. The shopper identification system of claim 1 wherein the digital promotion is redeemable toward a product for purchase of the brand.

7. A shopper identification server comprising:
    a processor and an associated memory configured to
        obtain product purchase history data corresponding to a plurality of shoppers,
        obtain shopper identification data corresponding to the plurality of shoppers,
        determine shopper demographics associated with purchased products of a brand based upon the product purchase history data and the shopper identification data,
        cooperate with a user device to operate a chatbot to obtain desired shopper reach data via a natural language processing (NLP) interface, the desired shopper reach data associated with a digital promotion and being accepted via the user device,
        apply a large language model (LLM) to identify prospective shoppers from among the plurality of shoppers that are likely to purchase products of the brand based upon the shopper demographics and based upon the desired shopper reach data, the LLM identifying the prospective shoppers by accepting, as input thereto, the shopper demographics as LLM words, and predicting next LIM words correlated to the prospective shoppers, the LLM being trained based upon supervised learning techniques to classify the plurality of shoppers based upon the shopper demographics, and generate and communicate the digital promotion to corresponding ones of a plurality of shopper devices associated with the prospective shoppers.

8. The shopper identification server of claim 7 wherein the processor is configured to cooperate with the user device to accept desired digital promotion data associated with the digital promotion and apply the LIM to identify the prospective shoppers based upon the desired digital promotion data.

9. The shopper identification server of claim 7 wherein the processor is configured to identify the prospective shoppers by at least excluding shoppers that have previously purchased a product of the brand.

10. A method of identifying a shopper comprising:
using a shopper identification server to
obtain product purchase history data corresponding to a plurality of shoppers,
obtain shopper identification data corresponding to the plurality of shoppers,
determine shopper demographics associated with purchased products of a brand based upon the product purchase history data and the shopper identification data,
cooperate with a user device to operate a chatbot to obtain desired shopper reach data via a natural language processing (NLP) interface, the desired shopper reach data associated with a digital promotion and being accepted via the user device,
apply a large language model (LLM) to identify prospective shoppers from among the plurality of shoppers that are likely to purchase products of the brand based upon the shopper demographics and based upon the desired shopper reach data, the LLM identifying the prospective shoppers by accepting, as input thereto, the shopper demographics as LLM words, and predicting next LLM words correlated to the prospective shoppers, the LLM being trained based upon supervised learning techniques to classify the plurality of shoppers based upon the shopper demographics, and
generate and communicate the digital promotion to corresponding ones of the plurality of shopper devices associated with the prospective shoppers.

11. The method of claim 10 wherein using the shopper identification server comprises using the shopper identification server to cooperate with the user device to accept desired digital promotion data associated with the digital promotion and apply the LLM to identify the prospective shoppers based upon the desired digital promotion data.

12. A non-transitory computer readable medium for identifying shoppers, the non-transitory computer readable medium comprising computer executable instructions that when executed by a processor cause the processor to perform operations comprising:
obtaining product purchase history data corresponding to a plurality of shoppers;
obtaining shopper identification data corresponding to the plurality of shoppers;
determining shopper demographics associated with purchased products of a brand based upon the product purchase history data and the shopper identification data;
cooperating with a user device to operate a chatbot to obtain desired shopper reach data via a natural language processing (NLP) interface, the desired shopper reach data associated with a digital promotion and being accepted via the user device;
applying a large language model (LLM) to identify prospective shoppers from among the plurality of shoppers that are likely to purchase products of the brand based upon the shopper demographics and based upon the desired shopper reach data, the LLM identifying the prospective shoppers by accepting, as input thereto, the shopper demographics as LLM words, and predicting next LLM words correlated to the prospective shoppers, the LLM being trained based upon supervised learning techniques to classify the plurality of shoppers based upon the shopper demographics; and
generating and communicating the digital promotion to corresponding ones of the plurality of shopper devices associated with the prospective shoppers.

13. The non-transitory computer readable medium of claim 12 wherein the operations comprise cooperating with the user device to accept desired digital promotion data associated with the digital promotion and apply the LLM to identify the prospective shoppers based upon the desired digital promotion data.

* * * * *

UNITED STATES PATENT AND TRADEMARK OFFICE
CERTIFICATE OF CORRECTION

PATENT NO. : 12,277,574 B1  
APPLICATION NO. : 18/529988  
DATED : April 15, 2025  
INVENTOR(S) : Bube et al.

Page 1 of 1

It is certified that error appears in the above-identified patent and that said Letters Patent is hereby corrected as shown below:

In the Claims

| Column 8, | Line 24 | Delete: "LIM" |
| | | Insert: --LLM-- |

| Column 8, | Line 63 | Delete: "LIM" |
| | | Insert: --LLM-- |

| Column 9, | Line 7 | Delete: "LIM" |
| | | Insert: --LLM-- |

Signed and Sealed this  
Thirtieth Day of September, 2025

John A. Squires  
*Director of the United States Patent and Trademark Office*